United States Patent [19]

Kobayashi et al.

[11] Patent Number: 4,777,001
[45] Date of Patent: Oct. 11, 1988

[54] EXTRUDING METHOD

[75] Inventors: Masao Kobayashi, Inazawa; Yasuhisa Kuzuya, Gifu, both of Japan

[73] Assignee: Toyoda Gosei Co., Ltd., Nishikasugai, Japan

[21] Appl. No.: 26,218

[22] Filed: Mar. 16, 1987

[30] Foreign Application Priority Data

Mar. 18, 1986 [JP] Japan ................... 61-060213

[51] Int. Cl.⁴ ............................................. B29C 47/12
[52] U.S. Cl. .......................... 264/177.16; 156/244.13; 264/177.17; 264/177.19; 264/209.4; 264/209.8; 264/563; 425/376.1; 425/461; 425/467
[58] Field of Search ............... 264/177.14, 177.16, 264/177.19, 209.8, 177.17, 177.1, 209.3–209.5, 563, 566; 425/376 R, 376 A, 374, 461, 467, 156, 244.13

[56] References Cited

U.S. PATENT DOCUMENTS

| | | | |
|---|---|---|---|
| 1,513,590 | 10/1924 | Denison | 425/465 |
| 2,524,829 | 10/1950 | Perzel | 425/465 |
| 3,357,051 | 12/1967 | Zolotarevsky | 425/464 |
| 3,380,129 | 4/1968 | Magruder | 425/467 |
| 3,427,371 | 2/1969 | Skinner | 425/4 C |
| 3,527,859 | 9/1970 | Fairbanks | 264/146 |
| 3,562,879 | 2/1971 | Cremer et al. | 425/380 |
| 3,773,885 | 11/1973 | Boone | 264/177.19 |
| 3,843,475 | 10/1974 | Kent | . |
| 4,321,228 | 3/1982 | de Kok | 264/209.8 |
| 4,323,339 | 4/1982 | de Kok et al. | 264/209.8 |
| 4,351,868 | 9/1982 | Otani | . |
| 4,360,549 | 11/1982 | Ozawa et al. | . |
| 4,504,210 | 3/1985 | Titz et al. | 264/209.8 |

FOREIGN PATENT DOCUMENTS

| | | | |
|---|---|---|---|
| 51-47961 | 4/1976 | Japan | 425/467 |
| 51-26946 | 8/1976 | Japan | 425/467 |

Primary Examiner—Jeffery Thurlow
Attorney, Agent, or Firm—Cushman, Darby & Cushman

[57] ABSTRACT

An extruding method for manufacturing an elongate strip partially having at least one cross-sectional T-shaped part composed of a head section and a leg section, which comprises extruding a material, partitioning the head section and the leg section in the vicinity of the exit end of the die, uniting the head section and the leg section naturally and solidifying the extruded strip. Hereby, recesses undesirably formed on the surface corresponding to the junction of the head section and the leg section composing the cross-sectional T-shaped part of the elongate strip when using methods heretofore known, can be prevented.

12 Claims, 3 Drawing Sheets

FIG. 1
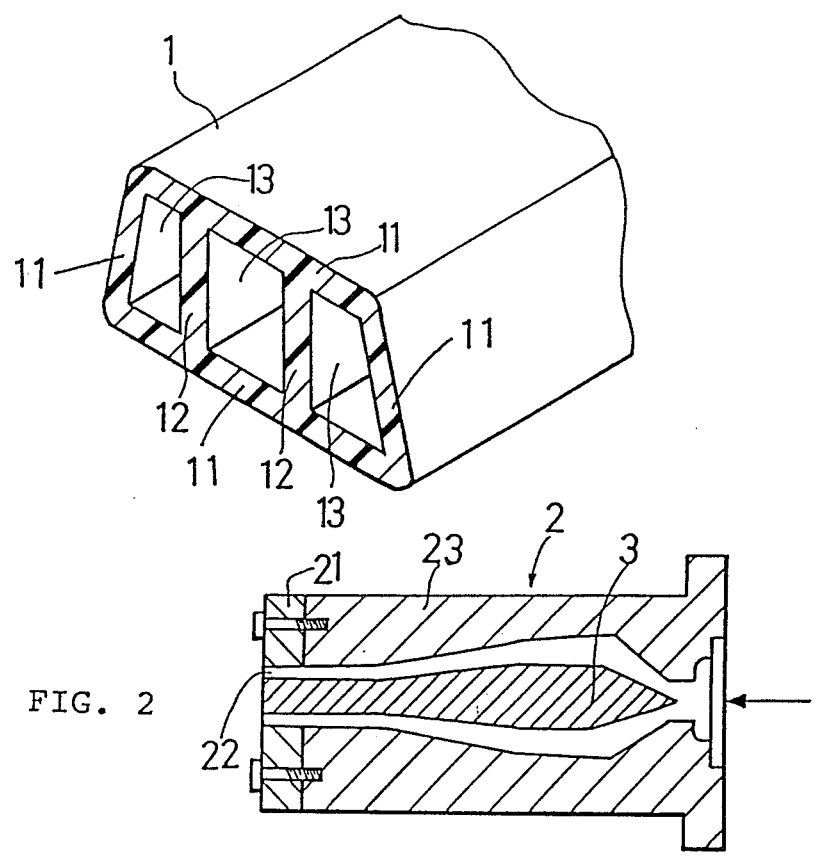
FIG. 2
FIG. 3
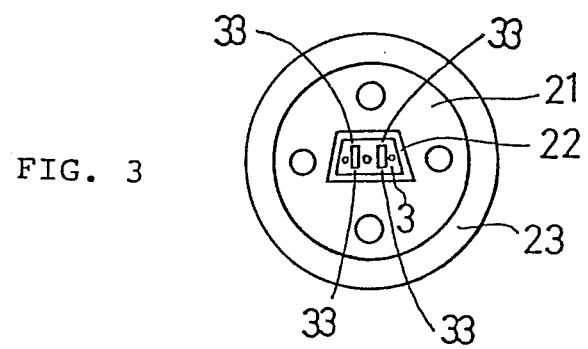

EXTRUDING METHOD

BACKGROUND OF THE INVENTION

1. Field of the Invention

The present invention relates to an extruding method for manufacturing an elongate strip, such as an automotive molding, having at least one longitudinally extending hollow, cavity or lumen.

2. Description of the Prior Art

In some cases, moldings of rubber or resin are attached to the body of an automobile to protect the surface of the body and to provide a decorative effect. The molding, in general, is attached adhesively to the body by means of an adhesive film or with an adhesive.

Recently, a molding having a hollow or hollows has been developed in view of reducing the weight of the automobile. Such a molding tends to be decreased in strength because of the hollow hollows. To prevent a decrease in strength and an increase in weight, the hollow or hollows are filled with a foamed material or are partitioned by walls.

In manufacturing a molding having a partitioned hollow or hollows, an extruding die assembly having a partitioned cavity is used. Then, a material, such as a plasticized resin or rubber, is extruded through the cavity, and the extruded material is solidified to provide the molding. For example, as illustrated in FIGS. 6, 7 and 8, the extruding die assembly comprises a die 100 having an opening 101 defining the external shape of the molding, and an adapter 200 firmly holding the die 100 and mounted on an extruder (not shown) and a torpedo-like core 300 held within the adapter 200 and having an outer end located within the opening 101 with the end surface thereof flush with the outer end surface of the die 100.

As illustrated in FIG. 6, the torpedo-like core 300 has a rear end divided into three parallel columnar sections 301 longitudinally extending and defining slit-shaped spaces 302 therebetween. Three parallel columnar sections 301 are extended from the end portion of the torpedo-like core 300 toward the rear end of the same.

The material extruded from the nozzle of the extruder flows through a space formed between the inner surface of the adapter 200 and the outer surface of the torpedo-like core 300 filling the slit-shaped spaces 302 formed between the columnar sections 301.

Part of the provided molding is a substantially T-shaped in transverse cross-section. The T-shaped part comprises head section in the form of a flat plate and leg section projecting from the middle of the head section. The leg section is the section formed by flow through the slit-shaped space 302. Therefore, the provided molding has two leg sections. Namely, the surface opposing the leg section of the T-shaped part corresponds to the surface of the molding, and the leg section corresponds to the wall which partitions the hollows.

In some cases, recesses deteriorating the external appearance of the molding are formed on the surface corresponding to the junction of the head section and the leg section of molding having partitioned hollows molded by the foregoing method. Although the causes of the formation of such recesses is not evident, it is inferred that such recesses are formed due to a subtle difference in the flow speed of the material between the portion of the cavity corresponding to the junction of the head section and the leg section, and the portion of the cavity corresponding to the head section or the leg section, because the volume of the extruded material in the portion of the cavity corresponding to the junction of the head section and the leg section is higher than that in the other portion of the cavity. Then, the inner stress becomes different between the junction of the head section and the leg section, and the other portion of the molding.

SUMMARY OF THE INVENTION

The present invention has been made in view of the foregoing problem.

Accordingly, it is an object of the present invention to provide an extruding method capable of effective prevention of the formation of such recesses.

These and other objects have been attained by the method for manufacturing an elongate strip having, among other fractures, at least one cross-sectional T-shaped part composed of a head section in the form of the flat plate and a wall-shaped leg section projecting from the middle of the head section, which comprises: extruding a plasticized material having at least one of said cross-sectional T-shaped parts in which said head section and said leg section are joined together through the cavity of an extruding die assembly having a cross-section corresponding to the cross-section of said elongate strip toward the exit end of said extruding die assembly; partitioning said head section and said leg section of said T-shaped part as said plasticized material passes a partition wall placed in the vicinity of the exit end of said extruding die assembly; uniting said head section and said leg section naturally to form said T-shaped part after said plasticized material passes said partition wall; solidifying said extruded elongate strip having at least one of said cross-sectional T-shaped parts.

BRIEF DESCRIPTION OF THE DRAWINGS

A more complete appreciation of the invention and many of the attendant advantages thereof will be readily obtained as the same better understood by reference to the following detailed description when considered in connection with the accompanying drawings, wherein:

FIG. 1 is a partly sectional fragmentary perspective view of a side molding formed by an extruding method, in a first embodiment, according to the present invention;

FIG. 2 is a longitudinal sectional view of an extruding die assembly employed in carrying out the first embodiment;

FIG. 3 is a side elevation of the extruding die assembly of FIG. 2;

DETAILED DESCRIPTION OF THE INVENTION

Figure 4:
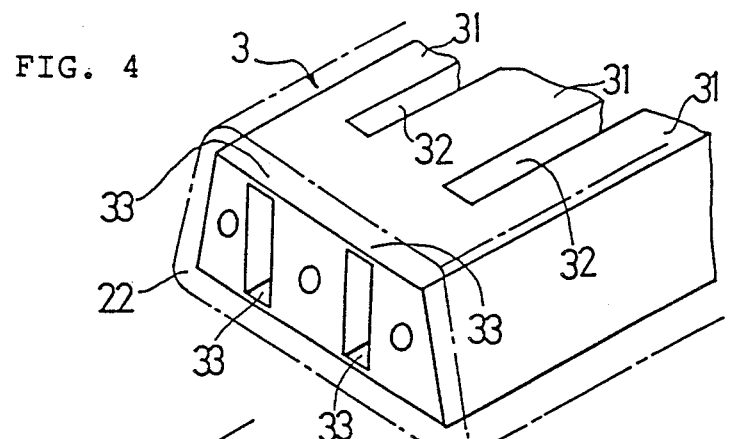
FIG. 4 is a perspective view of the front portion of a torpedo-like core incorporated into the extruding die assembly of FIG. 2.

A molded article manufactured by the extruding method according to the present invention has partitioned hollows and a substantially T-shaped part or parts which consists of head section and leg section in a cross-section. The upper surfaceof the head section is exposed outside, while the leg section partitions the hollow of the molded article and serves as a reinforcement. The molded article may be provided with a plurality of such leg sections, and the number of the leg sections is optional. The opposing head sections may be interconnected by joining the leg sections to form the molded articles in an H-shaped cross section.

An extruding die assembly for extruding such a molded article has a cavity of a cross-section corresponding to that of the molded article. That is, substantially T-shaped or substantially H-shaped gaps in a cross-section are formed as the sectional cavity. The extruding die assembly may comprise a shell part having the cavity, and a torpedo-like core having a slit-shaped space or spaces and disposed in the cavity of the die.

The material to be used in carrying out the present invention may be any ordinary material capable of plasticization, such as a thermoplastic resin or an unvulcanized rubber which can be used in the same way as the conventional method.

The principal feature of the present invention is to employ an extrusion die assembly having, at the exit end thereof, a partition wall for partitioning the head section and the leg section of the substantially T-shaped part, to partition the head section and the leg section at the exit end of the extruding die assembly, and to permit the head section and the leg section to unite naturally after passing the partition wall of the extruding die assembly.

The partition wall of the extruding die assembly is disposed in the vicinity of the exit of the cavity, for example, the partition wall may be formed with the outer end thereof flush with a surface defining the exit of the cavity. When the partition wall is formed at such a position, the head section and the leg section unite naturally after being extruded outside the cavity.

The partition wall may be formed with the outer end thereof slightly back from the surface defining the exit of the cavity. When the partition wall is thus formed, the head section and the leg section unite naturally before being extruded from the cavity. If the outer end of the partition wall is recessed exclusively, the effect of separating the head section and the leg section is reduced, and hence the aforementioned recesses are liable to be formed. Therefore, it is desirable to decice the position of the outer end of the partition wall through experiments.

Desirably, the partition wall is formed so as to have a small thickness. When the partition wall is excessively thick, the head section and the leg section are unable to unite naturally leaving a gap therebetween; consequently, the extruded article is unable to have a desired strength. The desirable thickness of the partition wall is 1.5 mm or below.

The head section and the leg section are caused to unite naturally by the agency of mutual contact caused by the shrinkage or expansion thereof or mutual contact by the agency of the gravity. The head section and the leg section need not necessarily be united, the same may be merely in contact with each other. However, since the material flowing near the exit of the cavity, in general, is hot, the head section and the leg section unite by fusion. If the partition wall is formed with the outer end thereof slightly back from the surface defining the exit of the cavity, the head section and the leg section unite by fusion satisfactorily, although it is only for a very short time that the head section and the leg section are heated after coming into contact in the die.

An extruding method according to the present invention employs an extruding die assembly having a cavity of a cross-section corresponding to the cross-section of an elongate strip having a substantially T-shaped part or parts which comprise a head section having a cross-section in the form of a flat plate and a wall-shaped leg section projecting from the middle of the head section. A material, such as a plasticized resin or rubber is extruded through the cavity of the extruding die assembly and the extruded material is solidified. The extruding die assembly employed in carrying out the extruding method according to the present invention has, in the vicinity of the exit end thereof, a partition wall for partitioning the head section and the leg section forming the T-shaped part. The partition wall partitions the head section and the leg section as the same are extruded through the cavity, and the head section and the leg section unite to form the integral elongate strip after passing the partition wall.

According to the present invention, the head section and the leg section of the T-shaped part are partitioned temporarily as the same pass the partition wall of the extruding die assembly, and then unite naturally after passing the partition wall. Thus, although the causes are not evident, the formation of the aforementioned recesses on the surface corresponding to the junction of the head section and the leg section of the T-shaped part is prevented.

Accordingly, the extruded elongate strip produced by the extruding method of the present invention has flat external surfaces and has an excellent external appearance. The extrusion can be carried out in a conventional manner and work efficiency becomes higher without necessitating an increase in the number of man-hours for producing the same amount of product.

Having generally described this invention, a further understanding can be obtained by reference to certain specific examples which are provided herein for purposes of illustration only and are not intended to be limiting unless otherwise specified.

First Embodiment

The first embodiment is an application of the present invention to manufacturing an automotive side molding 1 as illustrated in FIG. 1.

The side molding 1 is formed of a polyvinyl chloride resin as a hollow elongate strip having a substantially trapezoidal cross-section. The side molding 1 is provided with two longitudinal reinforcement walls 12 interconnecting the upper wall and the lower wall of cylindrical part 11 and partitioning the interior of the side molding 1 into three hollows 13. The cylindrical part 11 and the reinforcement walls 12 constitute a head section and a leg section of an elongate strip having a substantially H-shaped cross section.

An extruding die assembly employed in carrying out the first embodiment will be described with reference to FIGS. 2 to 4.

As illustrated in FIGS. 2 and 3, the extruding die assembly 2 comprises a die 21 having an opening 22 defining the external shape of the side molding 1, and adapter 23 firmly holding the die 21 and mounted on an extruder (not shown) and a torpedo-like core 3 held within the adapter 23 and having an outer end located within the opening 22 with the end surface thereof flush with the outer end surface of the die 21.

As illustrated in FIG. 4, the torpedo-like core 3 has a rear end divided into three parallel columnar sections 31 longitudinally extending and defining slit-shaped spaces 32 therebetween, and a front end having partition walls 33 formed so as to interconnect the respective upper surfaces of the adjacent columnar sections 31 and the respective lower surfaces of the adjacent columnar sections 31, respectively, and so as to bridge the slit-shaped spaces 32. In this embodiment, the torpedo-like core 3 is 20 cm long and each of the partition walls 33 is from 0.5 to 1.5 cm long, formed inwardly from the rear end of each columnar section 31. The partition walls 33 each have the shape of plate having a thickness of 1 to 1.5 mm.

The extruding method employing the thus-constructed extruding die assembly will be described hereinafter.

Extruding process

The material, i.e., polyvinyl chloride resin, extruded from the nozzle of the extruder (not shown) flows through a space formed between the inner surface of the adapter 23 and the outer surface of the torpedo-like core 3 filling the slit-shaped spaces 32 formed between the columnar sections 31. In this embodiment, the temperature of the material is from 150° to 160° C. and the material is sufficiently plasticized.

Partitioning process

The flow of the material is partitioned at the partition walls 33 into a flow that flows through a space defined by the partition walls 33 and the inner surface of the die 21 (a flow of the material for forming the head section), and flows that flow through holes surrounded by the partition walls 33 and the columnar sections 31 (flows of the material for forming the leg section).

Uniting process

The temperature of the material is from 150° to 160° C. and the material is sufficiently plasticized immediately after being extruded from the opening 22, while the gap between the head section and the leg sections is as small as 1 to 1.5 mm, which corresponds to the thickness of the partition walls 33. Accordingly, the head section and the leg sections are brought naturally into contact with each other by the agency of gravity and unite by fusion to form the cylindrical part 11 and the reinforcement walls 12.

Solidifying process

The obtained molding is cooled to room temperature and solidified. Thus the side molding 1 as shown in FIG. 1 is molded through extrusion.

According to the extruding method of the present invention, the cylindrical part 11 and the reinforcement walls 12 of the side molding 1 are partitioned from each other immediately before being extruded from the opening 22 of the die 21, followed by the union of the cylindrical part 11 and the reinforcement walls 12. Accordingly, no recess is formed on the surface of the cylindrical part 11, and hence the cylindrical part 11 has an excellent external appearance.

Second Embodiment

Figure 5:
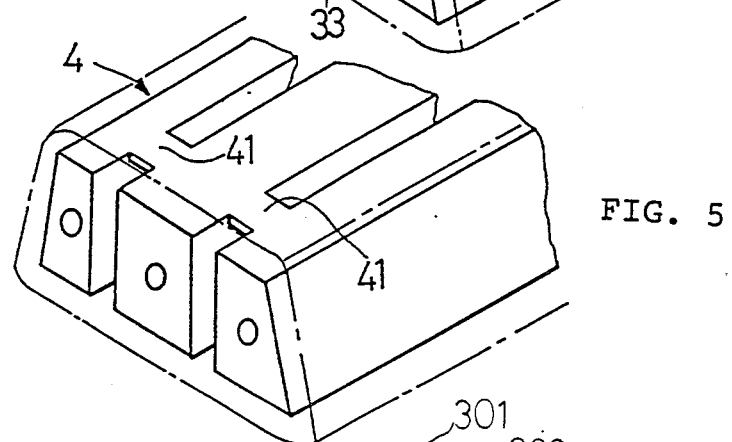
FIG. 5 is a perspective view of the front portion of a torpedo-like core incorporated into an extruding die assembly employed in carrying out an extruding method, in a second embodiment, according to the present invention.
Figure 6:
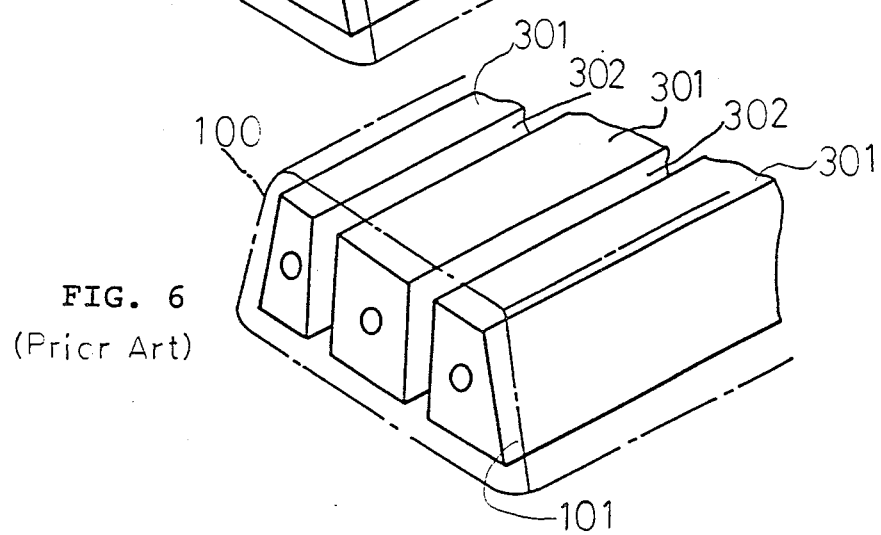
FIG. 6 is a perspective view of the front portion of a torpedo-like core incorporated into a conventional extruding die assembly.
Figure 7:
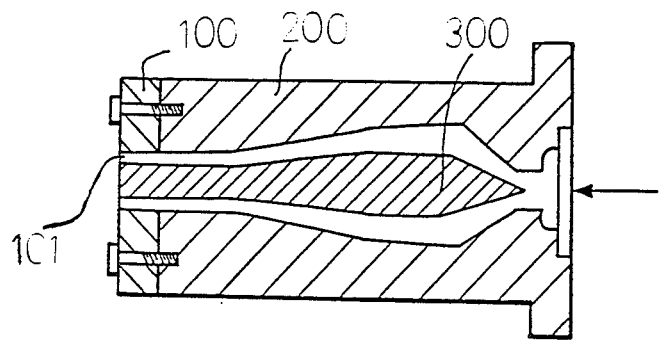
FIG. 7 is a longitudinal sectional view of the extruding die assembly of FIG. 6.
Figure 8:
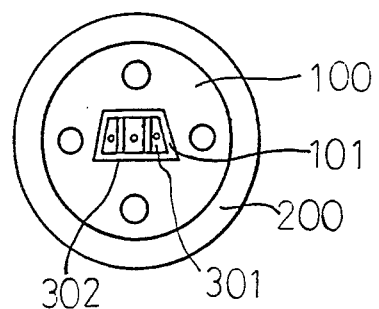
FIG. 8 is a side elevation of the extruding die assembly of FIG. 6.

A torpedo-like core 4 incorporated into an extruding die assembly employed in the second embodiment is shown in FIG. 5. The torpedo-like core 4 is the same as the torpedo-like core 3, except that the partition walls 41 of the torpedo-like core 4 are recessed from the front end of the torpedo-like core 4 by several millimeters.

When the extruding die assembly provided with the torpedo-like core 4 is used, partitioned flows of the material come naturally into contact with each other before the material is extruded from the opening of the die. Accordingly, although the head section and the leg sections are heated for only a short time after coming into contact in the die, the cylindrical part and reinforcement walls of the side molding unite by fusion satisfactorily.

Having now fully described the invention, it will be apparent to one of ordinary skill in the art that many changes and modifications can be made thereto without departing from the spirit or scope of the invention as set forth herein.

What is claimed:

1. A method for manufacturing a T-shaped portion of a longitudinally elongated strip out of heat-softened, extrudable material, comprising:
   providing an extrusion die assembly which includes:
   (a) a transversally-elongate head section passageway having two transversally oppositely extending limbs and arranged for extrudingly forming heat-softened material for a plate-shaped head part of the elongated strip, and,
   (b) juxtaposed alongside said head section passageway, a leg section passageway, elongated normally to said head section passageway and arranged for extrudingly forming heat-softened material for a wall-shaped leg part of said T-shaped portion of said strip, said leg section passageway being disposed adjacent a site which lies between said transversally opposite limbs of said head section passageway;
   providing said extrusion die assembly with an inlet end to said passageways and, longitudinally spaced from said inlet end, an outlet end from said passageways;
   while vertically intercommunicating said head section passageway laterally with said leg section passageway throughout a first, upstream portion of the longitudinal extent of each said passageway, near said inlet end, but vertically isolating said head section passageway laterally from said leg section passageway within a second, downstream portion of the longitudinal xtent of each said passageway; near said outlet end by interposing a partition wall between said head section passageway and said leg section passageway in said second, downstream portions,
   (a) extrudingly forcing a heat-softened, extrudable material into said extrusion die assembly through said inlet end, along said passageways and out of said outlet end, so that as said material passes through said second, downstream portions, said partition wall vertically separates said head part thereof from said leg part,
   (b) longitudinally beyond a downstream end of said partition wall, at a stage where said material remains heat-softened and tacky, permitting said head part to collapse under influence of gravity into united adhering contact with said leg part of said site; and (c) permitting said heat-softened material, as thereby extruded and united to cool to provide an integral elongated strip having a portion of T-shaped transverse cross-section.

2. The method of claim 1, wherein:
said partition wall is interposed so as to have said downstream end thereof located coterminously with said outlet end of said passageways, and said permitting to unite takes place downstream of said outlet end.

3. The method of claim 1, wherein:
said partition wall is interposed so as to have said downstream end thereof located upstream of said outlet end of said passageways, and said permitting to unite takes place within said extrusion die assembly upstream of said outlet end.

4. The method of claim 1, wherein:
said material is polyvinylchloride which, while within said extrusion die assembly remains at a temperature of 150°–160° C., and said partition wall is 1 to 1.5 mm thick.

5. The method of claim 1, wherein:
said extrusion die assembly is further provided so that said opposite limbs of said transversally elongated head section extend away from said site in opposite directions, around corners, until they rejoin at a second site at an intermediate location along a transversally-elongated foot section for forming said elongated strip in tubularly cylindrical form with said leg part depending from said head part towards a foot part of said material, which is also extruded in said extrudingly forcing step, through said foot section of said extrusion die assembly.

6. The method of claim 5, further comprising:
while conducting said extrudingly forcing step, vertically intercommunicating said foot section of said head section passageway laterally with said leg section passageway at said second site throughout a first, upstream portion of the longitudinal extent of each said passageway, near said inlet end, but vertically isolating said foot section passageway laterally from said leg section passageway within a second downstream portion of the longitudinal extent of each said passageway near said outlet end by interposing a second partition wall between said foot section of said head section passageway and said leg section passageway in said second, downstream portions, so that, as said extrudingly forcing step is conducted and said material passes through said second downstream portions, said second partition wall vertically separates said leg part from said foot part; longitudinally beyond a downstream end of said partition wall, at a stage where said material remains heat-softened and tacky, said leg part is permitted to collapse under influence of gravity into united adhering contact with said foot part at said second site, and said heat-softened material, as thereby extruded, united and permitted to cool provides an integral elongated strip having a portion of I-shaped transverse cross-section, in which the head part and foot part form a tube which is divided into two lumens by said leg part.

7. Apparatus for manufacturing a T-shaped portion of a longitudinally elongated strip out of heat-softened, extrudable material, comprising:
an extrusion die assembly which includes:

(a) a transversally-elongated head section passageway having two transversally oppositely extending limbs and arranged for extrudingly forming heat-softened material for a plate-shaped head part of the elongated strip, and, (b) juxtaposed alongside said head section passageway, a leg section passageway, elongated normally to said head section passageway and arranged for extrudingly forming heat-softened material for a wall-shaped leg part of said T-shaped portion of said strip, said leg section passageway being disposed adjacent a site which lies between said transversally opposite limbs of said head section passageway;

said extrusion die assembly having an inlet end to said passageways and, longitudinally spaced from said inlet end, an outlet end from said passageways;

said head section passageway being vertically intercommunicated laterally with said leg section passageway throughout a first, upstream portion of the longitudinal extent of each of said passageway, near said inlet end, but said head section passageway being vertically isolated laterally from said leg section passageway within a second, downstream portion of the longitudinal extent of each said passageway, near said outlet end by a partition wall interposed between said head section passageway and said leg section passageway in said second, downstream portions, whereby (a) a heat-softened, extrudable material may be extrudingly forced into said extrusion die assembly through said inlet end, along said passageways and out of said outlet end, so that as said material passes through said second, downstream portions, said partition wall vertically separates said head part thereof from said leg part, (b) longitudinally beyond a downstream end of said partition wall, at a stage where said material remains heat-softened and tacky, said head part may be permitted to collapse under influence of gravity into united adhering contact with said leg part of said site; and (c) said heat-softened material, as thereby extruded and united may be permitted to cool to provide an integral elongated strip having a portion of T-shaped transverse cross-section.

8. The apparatus of claim 7, wherein:
said partition wall has said downstream end thereof located coterminously with said outlet end of said passageways, so that said uniting may take place downstream of said outlet end.

9. The apparatus of claim 7, wherein:
said partition wall has said downstream end thereof located upstream of said outlet end of said passageways, so that said uniting may take place within said extrusion die assembly upstream of said outlet end.

10. The apparatus of claim 7, wherein:
said partition wall is 1 to 1.5 mm thick.

11. The apparatus of claim 7, wherein:
said opposite limbs of said transversally elongated head section extend away from said site in opposite directions, around corners, until they rejoin at a second site at an intermediate location along a transversally-elongated foot section for forming said elongated strip in tubularly cylindrical form with said leg part depending from said head part towards a first part of said material so that as said material is extruded some of said material may be extruded trhough said foot section of said extrusion dies assembly.

12. The apparatus of claim 11, wherein:
said foot section of said head section passageway is vertically communicated laterally with said leg section passageway at said second site throughout a first, upstream portion of the longitudinal extent of each said passageway, near said inlet end, but vertically isolated from said foot section passageway laterally from said leg section passageway within a second downstream portion of the longitudinal extent of each said passageway near said outlet end by a second partition wall interposed between said foot section of said head section passageway and said leg section passageway in said second, downstream portions, so that, as said material is extrudingly forced and said material passes through said second downstream portions, said second partition wall vertically separates said leg part from said foot part, longitudinally beyond a downstream end of said partition wall, at a stage where said material remains heat-softened and tacky, said leg part may collapse under influence of gravity into united adhering contact with said foot part at said second site, and said heat-softened material, as thereby extruded, united and permitted to cool may provide an integral elongated strip having a portion of I-shapedtransverse cross-section, in which the head part and foot part form a tube which is divided into two lumens by said leg part.

* * * * *

UNITED STATES PATENT AND TRADEMARK OFFICE
CERTIFICATE OF CORRECTION

PATENT NO. : 4,777,001

DATED : Oct. 11, 1988

INVENTOR(S) : KOBAYASHI et al.

It is certified that error appears in the above-identified patent and that said Letters Patent is hereby corrected as shown below:

Col. 1, line 19, correct "hollow hollows" to -- hollow or hollows --;

line 61, correct "molding" to -- moldings --.

Col. 2, line 17, correct "fractures" to -- features --;

line 40, correct "same better" to -- same becomes better --.

Col. 3, line 50, correct "exclusively" to -- excessively --;

line 53, correct "decice" to -- decide --.

Col. 4, line 26, correct "unite to" to -- unite naturally to --.

Col. 6, line 28, correct "transversally-elongate" to -- transversally-elongated --;

line 53, correct "xtent" to -- extent.

Col. 8, line 17, correct "an" to -- and --;

line 21, correct "each of said" to -- each said --.

Signed and Sealed this

Twelfth Day of September, 1989

Attest:

DONALD J. QUIGG

Attesting Officer

Commissioner of Patents and Trademarks